US009958896B2

(12) United States Patent
Kawahara et al.

(10) Patent No.: US 9,958,896 B2
(45) Date of Patent: May 1, 2018

(54) BEARING MEMBER FOR PEDAL ARM, PEDAL ARM, AND METHOD FOR MANUFACTURING PEDAL ARM

(75) Inventors: Nobuyuki Kawahara, Toyota (JP); Masanobu Ichikawa, Toyota (JP)

(73) Assignee: Toyoda Iron Works Co., Ltd., Toyota-shi, Aichi (JP)

( * ) Notice: Subject to any disclaimer, the term of this patent is extended or adjusted under 35 U.S.C. 154(b) by 0 days. days.

(21) Appl. No.: 14/122,113

(22) PCT Filed: Oct. 7, 2011

(86) PCT No.: PCT/JP2011/073266

§ 371 (c)(1), (2), (4) Date: Nov. 25, 2013

(87) PCT Pub. No.: WO2012/164768

PCT Pub. Date: Dec. 6, 2012

(65) Prior Publication Data

US 2014/0123801 A1 May 8, 2014

(30) Foreign Application Priority Data

May 27, 2011 (JP) ................................ 2011-119542

(51) Int. Cl.
*G05G 1/44* (2008.04)
*G05G 1/50* (2008.04)
(Continued)

(52) U.S. Cl.
CPC .............. *G05G 1/44* (2013.01); *F16C 11/045* (2013.01); *F16C 33/08* (2013.01); *G05G 1/50* (2013.01);
(Continued)

(58) Field of Classification Search
CPC .. F16C 1/26; F16C 1/262; F16C 33/08; F16C 35/02; F16C 2220/40; F16C 2220/42;
(Continued)

(56) References Cited

U.S. PATENT DOCUMENTS

2010/0058887 A1* 3/2010 Fujita et al. .................... 74/512
2010/0180717 A1* 7/2010 Himetani ........................ 74/560

FOREIGN PATENT DOCUMENTS

| DE | 10039808 A1 * | 2/2002 | ............. F16C 33/20 |
|---|---|---|---|
| JP | 11-29014 | 2/1999 | |
| JP | 2007-122610 | 5/2007 | |

OTHER PUBLICATIONS

Translation of DE 10039808, obtained Feb. 7, 2015.*
Machine Translation of DE 10039808, obtained Jun. 20, 2017.*

* cited by examiner

*Primary Examiner* — Richard W Ridley
*Assistant Examiner* — Brian J McGovern
(74) *Attorney, Agent, or Firm* — Finnegan, Henderson, Farabow, Garrett & Dunner, LLP

(57) ABSTRACT

A bearing member for a pedal arm, which is a tubular bearing member which is disposed so as to connect a first mounting hole and a second mounting hole formed respectively in a pair of plate members constituting right and left side walls of the pedal arm and through which a connecting shaft is passed so as to be rotatable relative to the bearing member, the bearing member includes: a large-diameter tubular portion configured to have an external diameter larger than a diameter of the first mounting hole and to be located between the pair of plate members; a first connecting portion configured to have an external diameter smaller than the diameter of the first mounting hole, to be formed so as to project from one end face of the large-diameter tubular portion coaxially with the large-diameter tubular portion, to be passed through the first mounting hole, and to be fixedly fitted to the first mounting hole by being compressed in an axial direction to be swaged so that a peripheral portion of the first mounting hole is held between a swaged portion, which is formed from the first connecting portion, and the one end face of the large-diameter tubular portion; and a second connecting portion configured to have an external diameter smaller than a diameter of the second mounting hole and a thickness larger than a thickness of the first connecting portion, to be formed so as to project from the other end face of the large-diameter tubular portion coaxially with the large-diameter tubular portion, to be passed through the second mounting hole, and to be fixedly fitted to the second mounting hole by being compressed in the axial direction to be bulged and deformed radially outward so that a portion of the second connecting portion, which is apart from the other end face of the large-diameter tubular portion by a predetermined distance, is brought into close contact with an inner peripheral wall of the second mounting hole.

6 Claims, 5 Drawing Sheets

(51) Int. Cl.
*F16C 33/08* (2006.01)
*F16C 11/04* (2006.01)
*G05G 1/46* (2008.04)
*F16C 35/02* (2006.01)

(52) U.S. Cl.
CPC .............. *G05G 1/506* (2013.01); *F16C 35/02* (2013.01); *F16C 2226/52* (2013.01); *F16C 2326/01* (2013.01); *G05G 1/46* (2013.01); *Y10T 29/4994* (2015.01); *Y10T 74/20528* (2015.01)

(58) Field of Classification Search
CPC ....... F16C 2320/28; F16C 17/02; G05G 1/30; G05G 1/44; G05G 1/445; G05G 1/50; G05G 1/506; B21K 21/12; B60T 7/06
USPC ............................................ 74/512–514, 560
See application file for complete search history.

BEARING MEMBER FOR PEDAL ARM, PEDAL ARM, AND METHOD FOR MANUFACTURING PEDAL ARM

CROSS-REFERENCE TO RELATED APPLICATIONS

This application is a national phase application of International Application No. PCT/JP2011/073266, filed Oct. 7, 2011, and claims the priority of Japanese Application No. 2011-119542, filed May 27, 2011, the content of both of which is incorporated herein by reference.

TECHNICAL FIELD

The invention relates to a pedal arm, and more specifically to an improvement of a tubular bearing member which is disposed across a pair of plate members that constitute side walls of the pedal arm and through which a connecting shaft is passed so as to be rotatable relative to the bearing member.

BACKGROUND ART

When a shaft such as a clevis pin is connected to a pedal arm so as to be rotatable relative to the pedal arm or when a pedal arm is supported pivotably, a bearing member is disposed in a plate member that constitutes the pedal arm. One example of such a pedal arm is described in Patent Document 1. The pedal arm has a hollow structure formed of a pair of halves, the pair of halves respectively has connecting holes, and a clevis pin is passed through the connecting holes so as to be rotatable relative to the halves. A cylindrical bearing member is fixedly provided in the connecting hole of one of the halves. Further, in an upper end portion of the pedal arm, at which the pedal arm is pivotably supported by a support shaft, burring holes are respectively formed in the pair of halves, and a cylindrical boss is disposed so as to pass through the burring holes and is fixed to the burring holes by welding.

Patent Document 2 describes a technique in which a bearing member is swaged to be fixed to a mounting hole formed in a plate member that constitutes a pedal arm, and a connecting shaft such as a support shaft is connected to the plate member via the bearing member so as to be rotatable relative to the plate member. The bearing member includes: (a) a large-diameter tubular portion which has an external diameter larger than the diameter of the mounting hole and through which the connecting shaft is passed so as to be rotatable relative to the large-diameter tubular portion, and (b) a connecting portion that has an external diameter smaller than the diameter of the mounting hole, that is formed coaxially with the large-diameter tubular portion so as to project from one end face of the large-diameter tubular portion, and that is passed through the mounting hole, wherein (c) when the connecting portion is compressed in the axial direction to be swaged (compressed), a peripheral portion of the mounting hole is held between a swaged portion, which is formed from the connecting portion, and the end face of the large-diameter tubular portion, whereby the bearing member is fixedly fitted to the mounting hole.

RELATED ART DOCUMENTS

Patent Documents

Patent Document 1: Japanese Patent Application Publication No. 2007-122610

Patent Document 2: Japanese Patent Application Publication No. 11-29014

SUMMARY OF THE INVENTION

Problem to Be Solved by the Invention

However, with regard to the bearing member for the clevis pin described in Patent Document 1, it is necessary to dispose the clevis pin across the connecting holes formed in the pair of halves, which may cause a problem regarding insertability of the clevis pin due to dimension errors or the like or may cause a possibility that the efficiency of load transmission between the clevis pin and the pedal arm will be reduced due to, for example, an inappropriate positional relationship between the clevis pin and the connecting holes. With regard to the bearing member (boss) to which the support shaft is connected, although there is no problem regarding insertability of the support shaft, it is necessary to fix the bearing member to the pair of halves by welding, which makes a work cumbersome and increases the cost. On the other hand, the technique described in Patent Document 2 may be applied to a pedal arm having a hollow structure formed by fitting a pair of plate members together, so that connecting portions are formed at respective ends of the large-diameter tubular portion and swaged to be respectively fixed to the pair of plate members. However, if the distance between the pair of plate members varies, the pedal arm may be deformed by swaging.

The invention is made in light of the above-described circumstances, and it is an object of the invention to provide a fixation technique which is implemented easily and at low cost, and with which a bearing member is appropriately fixed regardless of variations in the distance between a pair of plate members of a pedal arm when the bearing member is disposed across the pair of plate members such that insertability of a connecting shaft is secured.

Means for Solving the Problem

The object indicated above is achieved in the first aspect of the invention, a bearing member for a pedal arm, which is a tubular bearing member which is disposed so as to connect a first mounting hole and a second mounting hole formed respectively in a pair of plate members constituting right and left side walls of the pedal arm and through which a connecting shaft is passed so as to be rotatable relative to the bearing member, the bearing member characterized by including: (a) a large-diameter tubular portion having an external diameter larger than a diameter of the first mounting hole and located between the pair of plate members; (b) a first connecting portion that has an external diameter smaller than the diameter of the first mounting hole, that is formed so as to project from one end face of the large-diameter tubular portion coaxially with the large-diameter tubular portion, that is passed through the first mounting hole, and that is fixedly fitted to the first mounting hole by being compressed in an axial direction to be swaged so that a peripheral portion of the first mounting hole is held between a swaged portion, which is formed from the first connecting portion, and the one end face of the large-diameter tubular portion; and (c) a second connecting portion that has an external diameter smaller than a diameter of the second mounting hole and a thickness larger than a thickness of the first connecting portion, that is formed so as to project from the other end face of the large-diameter tubular portion coaxially with the large-diameter tubular portion, that is passed through the second mounting hole, and that is fixedly fitted to the second mounting hole by being compressed in the axial direction to be bulged and deformed radially outward so that a portion of the second connecting portion, which is apart from the other end face of the large-diameter tubular portion by a predetermined distance, is brought into close contact with an inner peripheral wall of the second mounting hole.

The second aspect of the invention, according to the bearing member for a pedal arm of the first aspect of the invention, characterized in that: (a) an axial length of the large-diameter tubular portion is set to be shorter than an allowable lower limit of a distance L between the pair of plate members so that the large-diameter tubular portion is interposed between the pair of plate members regardless of variation in the distance L; and (b) a projecting length of the second connecting portion from the other end face of the large-diameter tubular portion is set such that, regardless of variation in the distance L, the second connecting portion is passed through the second mounting hole and is bulged and deformed radially outward by being compressed in the axial direction so as to be brought into close contact with the inner peripheral wall of the second mounting hole.

The third aspect of the invention of a pedal arm having a hollow structure formed by integrally welding peripheral portions of a pair of plate-like halves having shapes obtained by dividing a shape of the pedal arm in a width direction, characterized in that: one of the pair of halves and the other one of the pair of halves have a first mounting hole and a second mounting hole, respectively; and the bearing member according to the first or second aspect of the invention is disposed so as to connect the first mounting hole to the second mounting hole.

The fourth aspect of the invention is a method for manufacturing the pedal arm according to the third aspect of the invention, the method characterized by including: a welding step of integrally welding the peripheral portions of the pair of halves in a state where the bearing member is disposed so as to locate the large-diameter tubular portion between the pair of halves, so that the first connecting portion is passed through the first mounting hole and the second connecting portion is passed through the second mounting hole; and a compression step of fixedly fitting the first connecting portion to the first mounting hole by swaging the first connecting portion, and fixedly fitting the second connecting portion to the second mounting hole by bulging and deforming the second connecting portion radially outward, in a series of compression processes in which the bearing member is compressed in the axial direction after the pair of halves are welded, and a compression load is increased.

Effect of the Invention

The bearing member of the pedal arm according to the first aspect of the invention is disposed so as to connect the pair of plate members constituting the right and left side walls of the pedal arm, it is possible to easily and appropriately connect the connecting shaft to the pedal arm by passing the connecting shaft through the bearing member. As a result, the efficiency of load transmission between the pedal arm and the connecting shaft is secured sufficiently. Further, when the first connecting portion that is connected to the first mounting hole is swaged by being compressed in the axial direction, the first connecting portion is fixedly fitted to the first mounting hole so that the peripheral portion of the first mounting hole is held between the swaged portion, which is formed from the first connecting portion, and the end face of the large-diameter tubular portion. Meanwhile, the second connecting portion that is connected to the second mounting hole is bulged and deformed radially outward by being compressed in the axial direction, so that the portion of the second connecting portion, which is apart from the end face of the large-diameter tubular portion by the predetermined distance, is brought into close contact with the inner peripheral wall of the second mounting hole. As a result, the second connecting portion is fixedly fitted to the second mounting hole. Accordingly, even if the distance L between the pair of plate members varies, variation is absorbed by changing a fixed portion at which the second connecting portion is fixed to the second mounting hole. Therefore, it is possible to fix the bearing member without deforming the pedal arm.

Further, because it is only necessary to compress the bearing member in the axial direction to compress and deform (swage and bulge) the first connecting portion and the second connecting portion at both ends of the bearing member, it is possible to perform fixation more easily and more inexpensively than in a case where fixation is performed by welding, thereby reducing the manufacturing cost. Particularly, the second connecting portion is thicker than the first connecting portion, and in view of this, if a compressive load that is applied in the axial direction is increased gradually, the thin first connecting portion is swaged first and then the second connecting portion is bulged and deformed. Thus, it is possible to compress and deform the first connecting portion and the second connecting portion sequentially by a series of compression operations to fix them.

In the second aspect of the invention, the axial length of the large-diameter tubular portion is set to be shorter than the allowable lower limit of the distance L so that, regardless of variations in the distance L, the large-diameter tubular portion is interposed between the pair of plate members. Moreover, the projecting length of the second connecting portion is set such that, regardless of variations in the distance L, the second connecting portion is passed through the second mounting hole and is then bulged and deformed radially outward by being compressed in the axial direction to be brought into close contact with the inner peripheral wall of the second mounting hole. This makes it possible to reliably fix the bearing member across the pair of plate members without deforming the pair of plate members regardless of variations in the distance L.

In the third aspect of the invention, a pedal arm having a hollow structure formed by integrally welding peripheral portions of a pair of plate-like halves having shapes obtained by dividing a shape of the pedal arm in a width direction, characterized in that: one of the pair of halves and the other one of the pair of halves have a first mounting hole and a second mounting hole, respectively; and the bearing member according to claim 1 or 2 is disposed so as to connect the first mounting hole to the second mounting hole. Thus, it can be obtained that the substantially same actions and effects as the first or second aspect of the invention.

The fourth aspect of the invention is a method for manufacturing the pedal arm according to the third aspect of the invention, in a series of processes in which the peripheral portions of the pair of halves are integrally welded in a state where the bearing member is disposed such that the first connecting portion is passed through the first mounting hole and the second connecting portion is passed through the second mounting hole, and subsequently, the bearing member is compressed in the axial direction to increase the compressive load, the first connecting portion is swaged to be fixed to the first mounting hole and the second connecting portion is bulged and deformed radially outward to be fixed to the second mounting hole. Thus, in addition to the same actions and effects as the third aspect of the invention can be obtained, the manufacturing cost is further reduced.

MODES FOR CARRYING OUT THE INVENTION

Figure 1B:
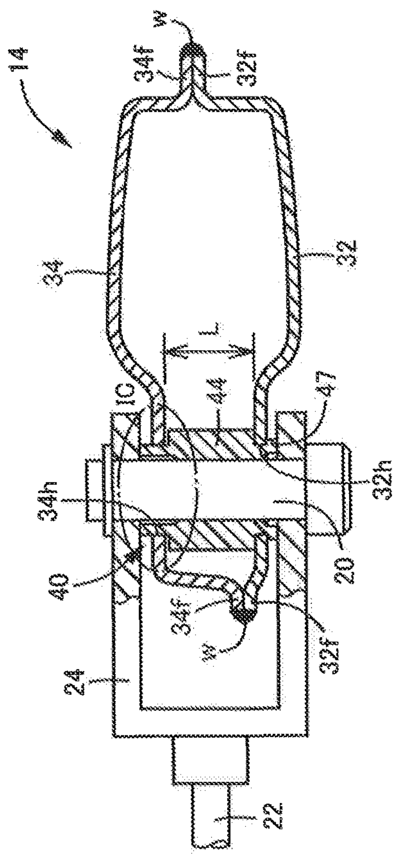
FIG. 1 illustrates views showing a brake pedal for a service brake of a vehicle to which the invention is applied, wherein FIG. 1(*a*) is a left side view, FIG. 1(*b*) is an enlarged view of a section taken along the line IB-IB in FIG. 1(*a*), and FIG. 1(*c*) is an enlarged sectional view showing a portion IC in FIG. 1(*b*).

The invention is suitably applied to, for example, a brake pedal, a clutch pedal, an accelerator pedal, and the like for vehicles, but may also be applied to operation pedals other than pedals for vehicles. Further, the third and fourth inventions relate to the pedal arm having a hollow structure formed of a pair of halves (plate members). However, the hollow structure is not necessarily configured such that a whole circumference is sealed in a saclike form, but may be opened partially.

The invention is suitably applied to a bearing member provided at a joint between a support shaft by which a pedal arm is pivotably supported and the pedal arm, a bearing member provided at a joint between a clevis pin that connects a pedal arm and a clevis such that the pedal arm and the clevis are rotatable relative to each other and the pedal arm, and the like.

The external diameter of a large-diameter tubular portion of a bearing member should be larger than the diameter of a first mounting hole and the diameter of a first connecting portion, and the inner diameter of a second mounting hole and the external diameter of a second connecting portion may be either larger or smaller than the external diameter of the large-diameter tubular portion. The bearing member has a cylindrical support inner peripheral face along which a connecting shaft is extended so as to be rotatable relative to the support inner peripheral face. However, it is preferable that the support inner peripheral face be formed at the large-diameter tubular portion, and it is also preferable that inner diameters of the first connecting portion and the second connecting portion be set to be slightly larger than the diameter of the support inner peripheral face in consideration of a change in the inner diameter due to compressive deformation. That is, when the bearing member is compressed in an axial direction and receives a compressive load, compressive stress in a circumferential direction acts on inner peripheral side, so that the first connecting portion and second connecting portion are compressed and deformed so as to bulge mainly radially outward. As a result, a distal end portion of the first connecting portion is swaged radially outward so that a peripheral portion of the first mounting hole is held between the first connection portion and the end face of the large-diameter tubular portion, while the second connecting portion is bulged and deformed radially outward so as to be brought into close contact with an inner peripheral wall of the second mounting hole. However, the first and second connecting portions may also bulge radially inward to some extent due to deformation resistance or the like, and in view of this, the inner diameters of the first and second connecting portions are set so as not to be smaller than the diameter of the support inner peripheral face even if the first and second connecting portions bulge radially inward. The support inner peripheral face is a portion which is brought into sliding contact with an outer peripheral face of the connecting shaft, and the diameter of the support inner peripheral face is set to be slightly larger than the external diameter of the connecting shaft.

The shape of the outer peripheral face of the large-diameter tubular portion is preferably cylindrical, but may be a polygonal column shape such as a square pole shape. The shapes of the inner and outer peripheral faces of the first connecting portion and the second connecting portion and the first mounting hole and the second mounting hole are also preferably cylindrical and a circular-hole shape, but a polygonal column shape or a polygonal hole may be employed, respectively. Further, the pair of plate members which constitute right and left side walls of the pedal arm according to the first invention may be a pair of halves having shapes obtained by dividing the shape of the pedal arm in a width direction, as in the case of the pedal arm according to the third invention, or may be, for example, a pair of flat side plate members fixedly fitted together by a plurality of connecting pins or the like in a such a position that the side plate members are substantially parallel to each other across a predetermined distance. As described above, it is possible to employ various forms.

In the second invention, the axial length of the large-diameter tubular portion and the projecting length of the second connecting portion are set, for example, on the basis of an allowable lower limit and an allowable upper limit of a distance L between the pair of plate members. However, when the first invention is implemented, the axial length may be set with a sufficient margin so that the large-diameter tubular portion is interposed between the pair of plate members regardless of variations in the distance L, and the projecting length may be set with a sufficient margin so that the second connecting portion is bulged and deformed by being compressed in the axial direction so that the second connecting portion is brought into close contact with the inner peripheral wall of the second mounting hole.

In the fourth invention, peripheral portions of the pair of halves are welded integrally in a state where the bearing member is disposed such that the first connecting portion is passed through the first mounting hole and the second connecting portion is passed through the second mounting hole, and after that, the bearing member is compressed in the axial direction so that the first connecting portion is swaged to be fixedly fitted to the first mounting hole while the second connecting portion is bulged and deformed radially outward to be fixedly fitted to the second mounting hole. However, when the other inventions are implemented, for example, swaging of the first connecting portion and bulging deformation of the second connecting portion may be performed in different steps. For example, the bearing member is axially compressed with the first connecting portion passed through the first mounting hole, so that the first connecting portion is swaged to be fixedly fitted to the first mounting hole. Subsequently, the peripheral portions of the pair of halves are integrally welded with the second connecting portion passed through the second mounting hole, and then, the bearing member is compressed again in the axial direction, so that the second connecting portion is bulged and deformed radially outward to be fixedly fitted to the second mounting hole.

Embodiments

Hereinafter, embodiments of the invention will be described in detail with reference to the accompanying drawings.

Figure 1C:
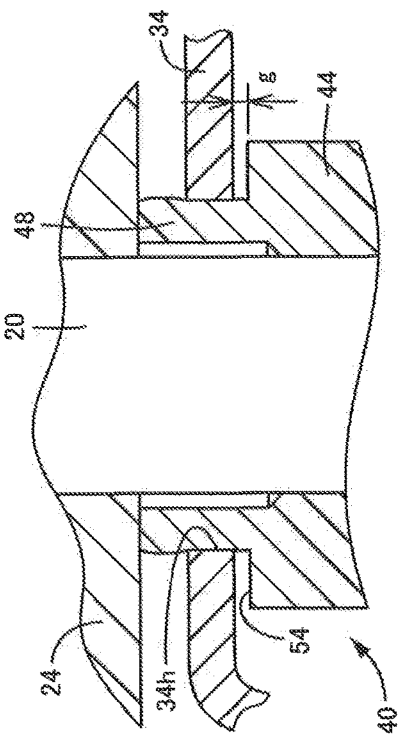
Figure 1A:
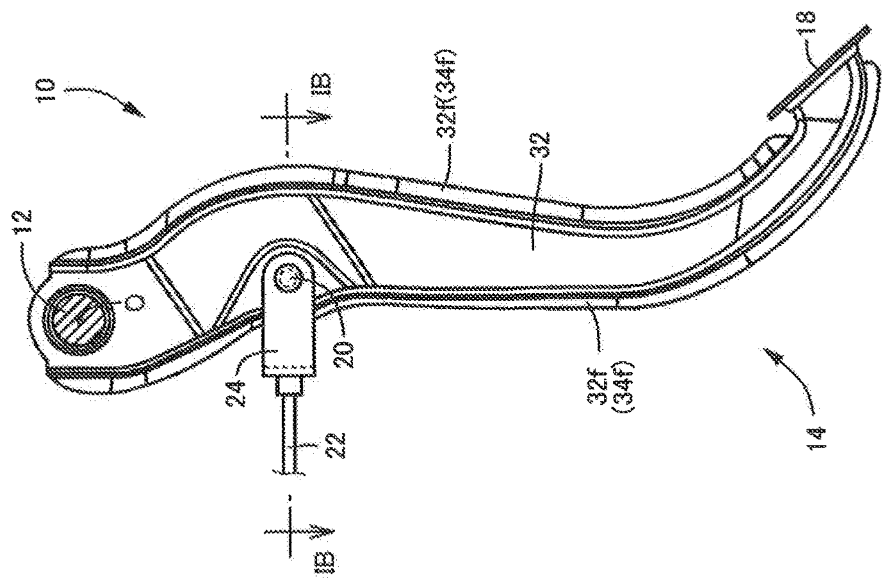

FIG. 1 illustrates views showing a brake pedal 10 for a service brake of a vehicle to which the invention is applied, wherein FIG. 1 (*a*) is a left side view, FIG. 1 (*b*) is an enlarged view of a section taken along the line IB-IB in FIG. 1(*a*), and FIG. 1(*c*) is an enlarged sectional view showing a portion IC in FIG. 1(*b*). The brake pedal 10 has a pedal arm 14 as a main component. The brake pedal 10 is supported, at an upper end portion of the pedal arm 14, so as to be pivotable about a support axis O, which is an axis of a substantially horizontal support shaft 12. A lower end portion of the pedal arm 14 is bent diagonally upward in a direction toward the rear of the vehicle so as to be oriented toward a driver seat, and a pedal sheet 18 is fixedly fitted to the distal end portion of the pedal arm 14. When a driver depresses the pedal sheet 18, the brake pedal 10 pivots clockwise about the support shaft 12 in FIG. 1(*a*). An output member 22 such as a pushrod is connected to the brake pedal 10 via a clevis 24 so as to be pivotable, relative to the brake pedal 10, about an axis of a clevis pin 20, which is substantially parallel to the support shaft 12. When the output member 22 is mechanically pushed leftward in FIG. 1(*a*) as the brake pedal 10 pivots, brake hydraulic pressure is generated on the basis of the depression force applied to the brake pedal 10. In the present embodiment, the clevis pin 20 corresponds to a connecting shaft.

The pedal arm 14 has a hollow structure having a substantially quadrangular section, and is formed of a pair of halves 32, 34 having shapes obtained by equally dividing the shape of the pedal arm in the lateral direction in the vehicle width direction. The halves 32, 34 are formed by subjecting a steel sheet to press forming, and each of them has a substantially hat-shape in section. In a state where the halves 32, 34 are in such positions that the opening sides of their hat-shapes face each other and plate-like outer peripheral flanges 32*f*, 34*f*, which are formed at peripheral portions so as to extend outward and which are parallel to each other, are overlapped so as to be in close contact with each other, outer edges of the outer peripheral flanges 32*f*, 34*f*, that is, edges thereof in the vehicle longitudinal direction and on the lower side in the vehicle are joined integrally with each other by arc welding or the like. A reference sign W in FIG. 1(*b*) indicates welded portions of the outer peripheral flanges 32*f*, 34*f*.

In pivot connecting portions of the pair of halves 32, 34, at which the clevis pin 20 is disposed, there are concentrically formed circular mounting holes 32*h*, 34*h* each having a diameter larger than that of a shaft portion of the clevis pin 20, and a metal bearing member 40 is disposed across the mounting holes 32*h*, 34*h* so as to be substantially parallel to an axis O of the support shaft 12 and is fixedly fitted to the mounting holes 32*h*, 34*h*. The bearing member 40 has a cylindrical shape with steps. The shaft portion of the clevis pin 20, which has a cylindrical outer peripheral face, is passed through the bearing member 40 so as to be rotatable relative to the bearing member 40, and the clevis pin 20 is prevented from being slipped out of the bearing member 40 by a snap ring or the like. The pair of halves 32, 34 corresponds to a pair of plate members that constitute right and left side walls of the pedal arm 14, and the mounting holes 32*h*, 34*h* of the halves 32, 34 correspond to a first mounting hole and a second mounting hole, respectively. Note that, in the present embodiment, the mounting holes 32*h*, 34*h* have the same diameter.

Figure 2:
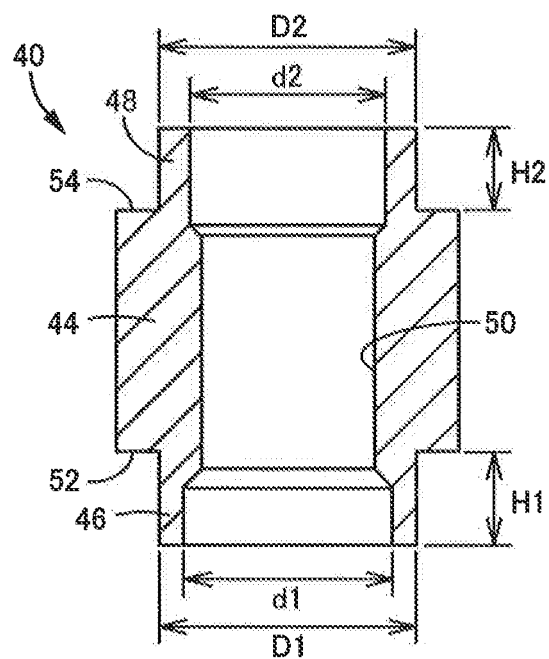
FIG. 2 is a sectional view of an initial shape of the bearing member before the bearing member of the embodiment of FIG. 1 is disposed in the pedal arm.

FIG. 2 is a sectional view of an initial shape of the bearing member 40 before the bearing member 40 is disposed in the pedal arm 14. The bearing member 40 has a cylindrical large-diameter tubular portion 44 having an external diameter larger than the diameter of each of the mounting holes 32*h*, 34*h* and located between the pair of halves 32, 34, and a pair of a first connecting portion 46 and a second connecting portion 48 having a cylindrical shape and projecting coaxially from both end faces 52, 54 of the large-diameter tubular portion 44, respectively, in an axial direction. The bearing member 40 is fixed, at the first connecting portion 46 and the second connecting portion 48, to the mounting holes 32*h*, 34*h*. The large-diameter tubular portion 44 has a cylindrical support inner peripheral face 50 that is slightly larger in diameter than a cylindrical outer peripheral face of the clevis pin 20, and the clevis pin 20 is brought into sliding contact with the support inner peripheral face 50 and disposed so as to be rotatable relative to the support inner peripheral face 50.

An external diameter D1 of the first connecting portion 46 is smaller than the external diameter of the large-diameter tubular portion 44 and smaller than the diameter of the mounting hole 32*h*, and an inner diameter d1 thereof is larger than the diameter of the support inner peripheral face 50 of the large-diameter tubular portion 44. The first connecting portion 46 is passed through the mounting hole 32*h* of the half 32 and is compressed in the axial direction to be swaged (squeezed) as illustrated in FIG. 1(*b*). As a result, the first connecting portion 46 is fixedly fitted to the mounting hole 32*h* so that the peripheral portion of the mounting hole 32*h* is held between a swaged portion 47, which is formed from the first connecting portion 46, and the end face 52 of the large-diameter tubular portion 44. A projecting length H1 of the first connecting portion 46 is set to such a value that the first connecting portion 46 is fixedly fitted, by swaging, to the mounting hole 32*h* so that the peripheral portion of the mounting hole 32*h* is held between the swaged portion 47 and the end face 52 of the large-diameter tubular portion 44. Further, the inner diameter d1 is set so as not to be smaller than the diameter of the support inner peripheral face 50 of the large-diameter tubular portion 44 even if the inner diameter d1 of the first connecting portion 46 is changed due to swaging.

An external diameter D2 of the second connecting portion 48 is smaller than the external diameter of the large-diameter tubular portion 44 and smaller than the diameter of the mounting hole 34*h*, and an inner diameter d2 thereof is larger than the diameter of the support inner peripheral face 50 of the large-diameter tubular portion 44. Although the external diameter D2 is equal to the external diameter D1, the inner diameter d2 is smaller than the inner diameter d1 and the second connecting portion 48 is larger in thickness than the first connecting portion 46 accordingly. When the second connecting portion 48 is passed through the mounting hole 34*h* of the half 34 and is compressed in the axial direction, the second connecting portion 48 is bulged and deformed radially outward as illustrated in FIG. 1(*c*), and a portion of the second connecting portion 48, which is apart from the end face 54 of the large-diameter tubular portion 44 by a predetermined distance g, is brought into close contact with an inner peripheral wall of the mounting hole 34*h* to be fixedly fitted to the mounting hole 34*h*. An axial length of the large-diameter tubular portion 44 is set to be shorter than an allowable lower limit of the distance L so that the large-diameter tubular portion 44 is interposed between the mounting holes 32*h*, 34*h* regardless of variations in the distance L between the mounting holes 32*h*, 34*h* of the pair of halves 32, 34. A projecting length H2 of the second connecting portion 48 is set based on variations in the distance L (more specifically, an allowable upper limit) such that, regardless of variations in the distance L, the second connecting portion 48 is passed through the mounting hole 34*h* and is bulged and deformed radially outward by being compressed in the axial direction to be brought into close contact with the inner peripheral wall of the mounting hole 34*h*. That is, because the mounting hole 32*h* of the half 32 is fixed while being in close contact with the end face 52 of the large-diameter tubular portion 44, the predetermined distance g changes depending on variations in the distance L. However, the axial length of the large-diameter tubular portion 44 is set such that g>0 is always satisfied regardless of variations in the distance L, and the projecting length H2 of the second connecting portion 48 is set such that the second connecting portion 48 is brought into close contact with the inner peripheral wall of the mounting hole 34*h* when the second connecting portion 48 is bulged and deformed radially outward by being compressed in the axial direction. The inner diameter d2 is set so as not to be smaller than the diameter of the support inner peripheral face 50 of the large-diameter tubular portion 44 even if the inner diameter d2 is changed due to the axial compressive deformation (bulging deformation) of the second connecting portion 48.

Figure 3A:
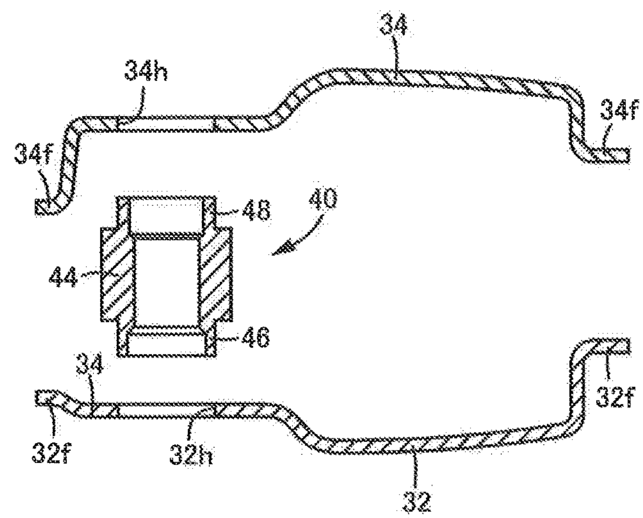
FIG. 3 illustrates a welding step in which peripheral portions of the halves are integrally welded by arc welding or the like with the bearing member disposed between the pair of halves.
Figure 3B:
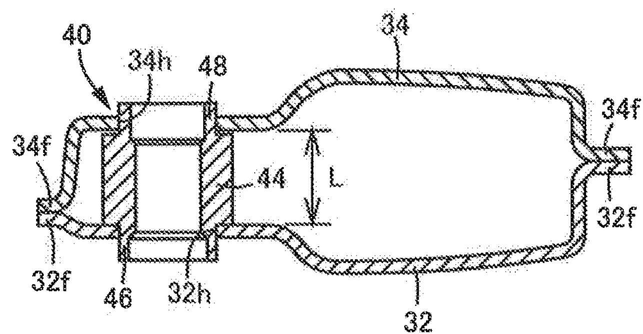
Figure 3C:
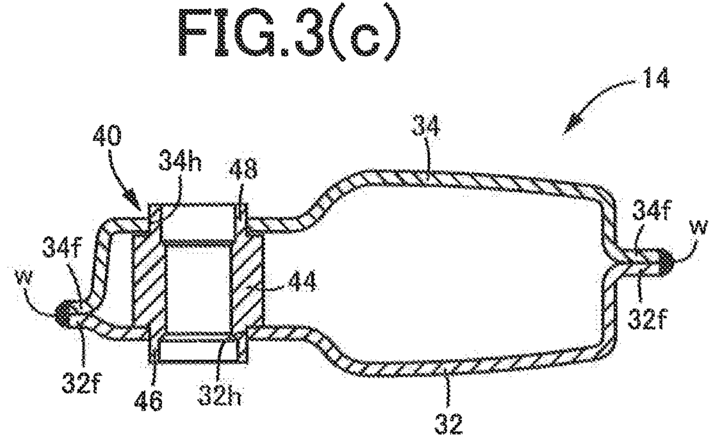
Figure 4A:
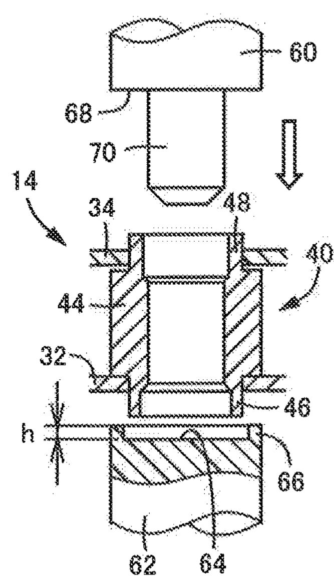
FIG. 4 illustrates a compression step in which the bearing member is compressed, so that the bearing member is fixedly fitted to the pedal arm.
Figure 4B:
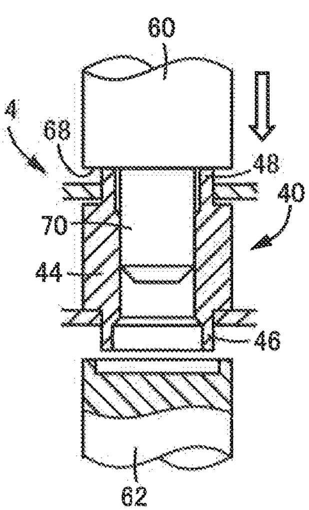
Figure 4C:
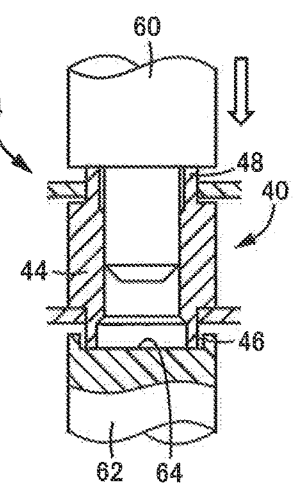
Figure 4D:
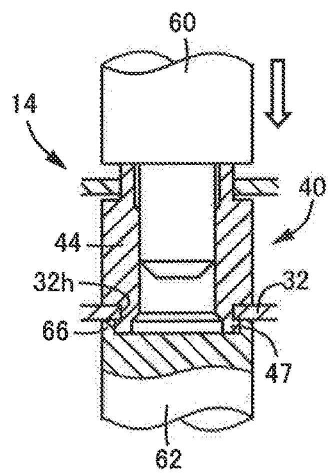
Figure 4E:
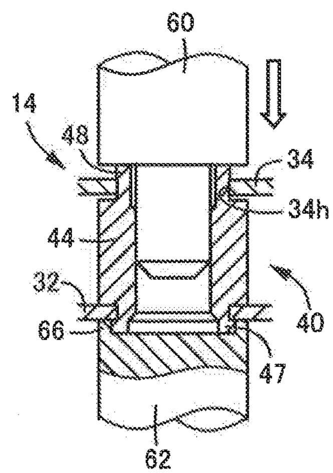
Figure 4F:
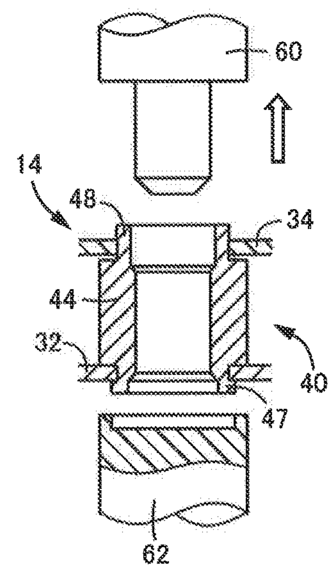

The pedal arm 14 having such a configuration is manufactured as follows. Peripheral portions of the halves 32, 34 are integrally welded by arc welding or the like with the bearing member 40 disposed between the pair of halves 32, 34 as illustrated in FIG. 3. After that, the bearing member 40 is compressed as illustrated in FIG. 4, so that the bearing member 40 is fixedly fitted to the pair of halves 32, 34 of the pedal arm 14. FIG. 3 illustrates a welding step and FIG. 4 illustrates a compression step.

The welding step in FIG. 3 will be described below in detail. In FIG. 3(*a*), the pair of halves 32, 34 is placed in such a position that the opening sides of their hat-shapes face each other, the bearing member 40 is placed between the halves 32, 34, and the mounting holes 32*h*, 34*h* and the bearing member 40 are aligned with each other so as to be substantially coaxial with each other. In FIG. 3(*b*), the halves 32, 34 are brought closer to each other, the first connecting portion 46 and the second connecting portion 48 of the bearing member 40 are passed through the mounting holes 32*h*, 34*h* of the halves 32, 34, respectively, and the halves 32, 34 are overlapped with each other so that outer peripheral flanges 32*f*, 34*f* are brought into close contact with each other. In the present embodiment, the pair of halves 32, 34 is brought closer to each other so that the first connecting portion 46 and the second connecting portion 48 of the bearing member 40 are passed through the mounting holes 32*h*, 34*h*, respectively. However, a method of assembling them together may be set as needed. For example, the first connecting portion 46 may be inserted into the mounting hole 32*h* of the half 32, which is one of the pair of halves 32, 34, and then the second connecting portion 48 may be inserted into the mounting hole 34*h* of the half 34, which is the other one of the pair of halves 32, 34. In this state, outer edges of the outer peripheral flanges 32*f*, 34*f* are joined integrally with each other by arc welding or the like as illustrated in FIG. 3(*c*). Thus, the pedal arm 14 having a hollow structure in which the bearing member 40 is disposed across the mounting holes 32*h*, 34*h* is obtained. At this time, the distance L between the mounting holes 32*h*, 34*h* of the pair of halves 32, 34 varies depending on processing errors or the like of the halves 32, 34. However, by appropriately setting the axial length of the large-diameter tubular portion 44 and the projecting length H2 of the second connecting portion 48, the bearing member 40 is retained in the pedal arm 14 with a predetermined clearance corresponding to the distance g left between the large-diameter tubular portion 44 and the half 34 in the axial direction of the bearing member 40.

In the compression step in FIG. 4, initially, as illustrated in FIG. 4(*a*), the pedal arm 14 is supported by a supporting device (not illustrated) in a floating state where the pedal arm 14 is movable up and down, so that the bearing member 40 is located at an intermediate position between a punch 60, which is driven up and down, and a stationary holding jig 62. On a holding face 64 at an upper end of the holding jig 62, there is formed a ring-shaped projection 66 that has a diameter larger than the external diameter of the first connecting portion 46 and that defines a swaged shape of the first connecting portion 46. A projecting length h of the ring-shaped projection 66 is set such that a swaged amount, with which the peripheral portion of the mounting hole 32*h* is reliably held by swaging, is reliably obtained by the time when the distal end of the ring-shaped projection 66 contacts a lower face (outer face) of the half 32. FIG. 4(*b*) illustrates a state where the punch 60 is moved downward and a pressing face 68 contacts the distal end of the second connecting portion 48 of the bearing member 40. After that, the pedal arm 14 is also moved downward as the punch 60 is moved downward. On the pressing face 68 of the punch 60, a guide pin 70, which is inserted into a space on the inner side of the support inner peripheral face 50 of the large-diameter tubular portion 44, is provided so as to project from the pressing face 68.

Figure 5:
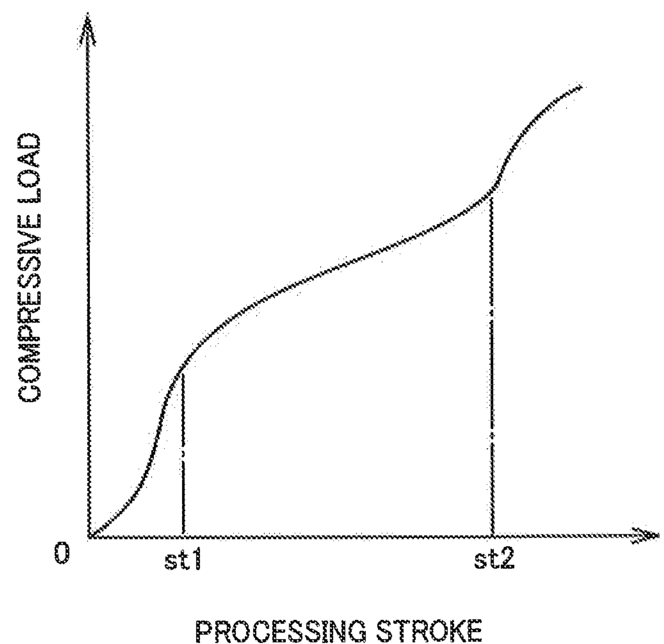
FIG. 5 illustrates a variation characteristic of the compressive load with respect to a processing stroke when the bearing member is compressed in the compression step of FIG. 4.

FIG. 4(*c*) illustrates a state where the distal end of the first connecting portion 46 of the bearing member 40 contacts the holding face 64 of the holding jig 62. When the punch 60 is further moved downward from this state, the first connecting portion 46 and the second connecting portion 48 are compressed and deformed on the basis of a compressive load applied by the punch 60. FIG. 4(*d*) illustrates a state where the first connecting portion 46, which is relatively thin, is swaged first by the compressive load to be fixedly fitted to the mounting hole 32*h* so that the peripheral portion of the mounting hole 32*h* is held between the end face 52 of the large-diameter tubular portion 44 and the swaged portion 47, which is formed from the first connecting portion 46, and the lower face (outer face) of the half 32 contacts the distal end of the ring-shaped projection 66 of the holding jig 62. When the lower face of the half 32 contacts the distal end of the ring-shaped projection 66 of the holding jig 62 as described above, further compressive deformation (swaging) of the first connecting portion 46 is prevented. FIG. 5 illustrates an example of a variation characteristic of the compressive load with respect to a processing stroke (downward stroke of the punch 60) after the distal end of the first connecting portion 46 of the bearing member 40 contacts the holding face 64 of the holding jig 62 as illustrated in FIG. 4(*c*). A processing stroke st1 is a stroke at which the first connecting portion 46 buckles radially outward and swaging is started, and a processing stroke st2 is a stroke at which the lower face of the half 32 contacts the distal end of the ring-shaped projection 66 of the holding jig 62 as illustrated in FIG. 4(*d*).

When the punch 60 is further moved downward from the state in FIG. 4(*d*), the compressive load further increases as illustrated in FIG. 5 and the second connecting portion 48, which is relatively thick, is bulged and deformed radially outward. FIG. 4(*e*) illustrates a state where, by bulging and deforming the second connecting portion 48 radially outward as described above, the portion of the second connecting portion 48, which is apart from the end face 54 of the large-diameter tubular portion 44 by the distance g, is brought into close contact with the inner peripheral wall of the mounting hole 34*h*, so that the second connecting portion 48 is fixedly fitted to the mounting hole 34*h*. Thus, a series of compression processing for fixing the bearing member 40 to the pedal arm 14 is finished, the punch 60 is lifted up to its original position, which is the same as that in FIG. 4(*a*), as illustrated in FIG. 4(*f*), and accordingly the pedal arm 14 is lifted to the intermediate position by the supporting device (not illustrated).

Because the bearing member 40 of the brake pedal 10 according to the present embodiment is disposed so as to connect the pair of halves 32, 34 constituting the right and left side walls of the pedal arm 14, it is possible to easily and appropriately connect the clevis pin 20 to the pedal arm 14 by passing the clevis pin 20 through the bearing member 40. As a result, the efficiency of load transmission between the pedal arm 14 and the clevis pin 20 is secured sufficiently.

Further, when the first connecting portion 46 that is connected to the mounting hole 32*h* is swaged by being compressed in the axial direction, the first connecting portion 46 is fixedly fitted to the mounting hole 32*h* so that the peripheral portion of the mounting hole 32*h* is held between the swaged portion 47, which is formed from the first connecting portion 46, and the end face 52 of the large-diameter tubular portion 44. Meanwhile, the second connecting portion 48 that is connected to the mounting hole 34*h* is bulged and deformed radially outward by being compressed in the axial direction, so that the portion of the second connecting portion 48, which is apart from the end face 54 of the large-diameter tubular portion 44 by the predetermined distance g, is brought into close contact with the inner peripheral wall of the mounting hole 34*h*. As a result, the second connecting portion 48 is fixedly fitted to the mounting hole 34*h*. Accordingly, even if the distance L between the pair of halves 32, 34 varies, variation is absorbed by changing a fixed portion at which the second connecting portion 48 is fixed to the mounting hole 34*h*. Therefore, it possible to fix the bearing member 40 without deforming the pedal arm 14. As a result, the bearing member 40 is disposed in the pedal arm 14 without reducing the pedal performances such as dimensional accuracy and strength of various portions of the pedal arm 14.

Further, because it is only necessary to compress the bearing member 40 in the axial direction to compress and deform (swage and bulge) the first connecting portion 46 and the second connecting portion 48 at both ends of the bearing member 40, it is possible to perform fixation more easily and more inexpensively than in a case where fixation is performed by welding, thereby reducing the manufacturing cost. Particularly, the second connecting portion 48 is thicker than the first connecting portion 46, and in view of this, if a compressive load that is applied in the axial direction is increased gradually, the thin first connecting portion 46 is swaged first and then the second connecting portion 48 is bulged and deformed. Thus, it is possible to compress and deform the first connecting portion 46 and the second connecting portion 48 sequentially by a series of compression operations to fix them.

Further, the axial length of the large-diameter tubular portion 44 is set to be shorter than the allowable lower limit of the distance L so that, regardless of variations in the distance L, the large-diameter tubular portion 44 is interposed between the pair of halves 32, 34 with a clearance corresponding to the distance g. Moreover, the projecting length H2 of the second connecting portion 48 is set such that, regardless of variations in the distance L, the second connecting portion 48 is passed through the mounting hole 34*h* and is then bulged and deformed radially outward by being compressed in the axial direction to be brought into close contact with the inner peripheral wall of the mounting hole 34*h*. This makes it possible to reliably fix the bearing member 40 across the pair of halves 32, 34 without deforming the pedal arm 14 regardless of variations in the distance L.)

Further, the present embodiment, in a series of processes in which the peripheral portions of the pair of halves 32, 34 are integrally welded in a state where the bearing member 40 is disposed between the pair of halves 32, 34 such that the first connecting portion 46 is passed through the mounting hole 32*h* and the second connecting portion 48 is passed through the mounting hole 34*h*, and subsequently, the bearing member 40 is compressed in the axial direction to increase the compressive load, the first connecting portion 46 is swaged to be fixed to the n counting hole 32*h* and the second connecting portion 48 is bulged and deformed radially outward to be fixed to the mounting hole 34*h*. Thus, the manufacturing cost is further reduced.

The embodiments of the invention are described in detail with reference the drawings. However, the above-described embodiments are just examples of the embodiments. The invention may be implemented in various other embodiments obtained by making modifications or improvements to the above-described embodiments on the basis of the knowledge of persons skilled in the art.

REFERENCE SIGNS LIST

14: pedal arm 20: clevis pin (connecting shaft) 32, 34: half (plate member) 32*h*: mounting hole (first mounting hole) 34*h*: mounting hole (second mounting hole) 40: bearing member 44: large-diameter tubular portion 46: first connecting portion 47: swaged portion 48: second connecting portion L: distance g: predetermined distance H2: projecting length of the second connecting portion

The invention claimed is:

1. A pedal comprising:

a hollow pedal arm having a first mounting hole and a second mounting hole that are provided in respective side walls of the hollow pedal arm, the respective side walls being opposite to each other in a width direction of the hollow pedal arm; and a tubular bearing member connecting the first mounting hole and the second mounting hole that are provided in the respective side walls of the hollow pedal arm, and rotatable relative to a connecting shaft that is passed through the tubular bearing member, wherein the tubular bearing member includes:

a large-diameter tubular portion having an external diameter larger than a diameter of the first mounting hole, and located between the respective side walls of the hollow pedal arm;

a first connecting portion projecting from one end face of the large-diameter tubular portion coaxially with the large-diameter tubular portion, the first connecting portion being passed through the first mounting hole and fixed to the first mounting hole;

a second connecting portion projecting from another end face of the large-diameter tubular portion coaxially with the large-diameter tubular portion, the second connecting portion being passed through the second mounting hole and fixed to the second mounting hole;

the first connecting portion of the tubular bearing member connecting the first and second mounting holes that are provided in the respective side walls of the hollow pedal arm being fixed to the first mounting hole, with a peripheral portion of the first mounting hole being held between the one end face of the large-diameter tubular portion and a radially protruding portion of the first connecting portion that protrudes outwardly in a radial direction of the tubular bearing member;

the second connecting portion of the tubular bearing member connecting the first and second mounting holes that are provided in the respective side walls of the hollow pedal arm being fixed to the second mounting hole, with a contact portion of the second connecting portion being in close contact with an inner peripheral wall of the second mounting hole, the other end face of the large-diameter tubular portion interconnecting an outer peripheral face of the large-diameter tubular portion and an outer peripheral face of the second connecting portion; and the inner peripheral wall defining an inner peripheral portion and an outer peripheral portion, the inner peripheral portion being between the outer peripheral portion and the other end face, the other end face spaced from the inner peripheral portion and defining a continuous gap between the inner peripheral portion and the other end face the hollow pedal arm having a hollow structure being formed by integrally welding peripheral portions of a pair of plate-like halves having shapes obtained by dividing a shape of the hollow pedal arm in the width direction, one of the pair of halves and the other one of the pair of halves constituting the respective side walls of the hollow pedal arm which are opposite to each other in the width direction.

2. The pedal according to claim 1, wherein:

an axial length of the large-diameter tubular portion is set to be shorter than an allowable lower limit of a distance L between the respective side walls of the hollow pedal arm which are opposite to each other in the width direction so that the large-diameter tubular portion is interposed between the respective side walls of the hollow pedal arm, and a projecting length of the second connecting portion from the other end face of the large-diameter tubular portion is set such that the second connecting portion is passed through the second mounting hole and is bulged and deformed radially outward by being compressed in an axial direction of the tubular bearing member such that the contact portion of the second connecting portion is in close contact with the inner peripheral wall of the second mounting hole.

3. The pedal according to claim 1, further comprising:

a support shaft disposed to be substantially parallel with the connecting shaft, and supporting the hollow pedal arm that is to be pivoted about an axis of the support shaft; and an output member connected to the connecting shaft, so as to be substantially linearly moved by pivot motion of the hollow pedal arm about the axis of the support shaft.

4. The pedal according to claim 3, wherein the output member and the connecting shaft are connected to each other via a U-shaped clevis, wherein the connecting shaft is supported in opposite end portions thereof by respective side walls of the clevis that are opposed to each other in the width direction, and wherein the tubular bearing member is interposed between the respective side walls of the clevis in the width direction.

5. A method for manufacturing a pedal, including (a) a hollow pedal arm having a first mounting hole and a second mounting hole that are provided in respective side walls of the hollow pedal arm, the respective side walls being opposite to each other in a width direction of the hollow pedal arm, the hollow pedal arm having a hollow structure being formed by integrally welding peripheral portions of a pair of plate-like halves having shapes obtained by dividing a shape of the hollow pedal arm in the width direction, one of the pair of halves and the other one of the pair of halves constituting the respective side walls of the hollow pedal arm which are opposite to each other in the width direction, and (b) a tubular bearing member connecting the first mounting hole and the second mounting hole that are provided in the respective side walls of the hollow pedal arm, and rotatable relative to a connecting shaft that is passed through the tubular bearing member, wherein the pedal arm is manufactured by using a tubular member that is to be converted into the tubular bearing member in a process of manufacturing the pedal, the tubular member including (i) a large-diameter tubular portion having an external diameter larger than a diameter of the first mounting hole, (ii) a first connecting portion projecting from one end face of the large-diameter tubular portion coaxially with the large-diameter tubular portion, and having an external diameter smaller than the diameter of the first mounting hole and (iii) a second connecting portion projecting from another end face of the large-diameter tubular portion coaxially with the large-diameter tubular portion, and having an external diameter smaller than a diameter of the second mounting hole, the second connecting portion having a thickness larger than a thickness of the first connecting portion, the method comprising:

a welding step of integrally welding the peripheral portions of the pair of plate-like halves in a state where the tubular member is disposed such that the large-diameter tubular portion of the tubular member is located between the pair of plate-like halves, and such that the first connecting portion is passed through the first mounting hole while the second connecting portion having the thickness larger than the thickness of the first connecting portion is passed through the second mounting hole; and a compression step of fixedly fitting the first connecting portion to the first mounting hole by swaging the first connecting portion, and fixedly fitting the second connecting portion to the second mounting hole by bulging and deforming the second connecting portion radially outward, in a series of compression processes in which the tubular member is compressed by a compression load applied in an axial direction of the tubular member after the pair of halves are welded, and the compression load is increased whereby the tubular member is converted into the tubular bearing member with the first and second connecting portions being deformed, such that a peripheral portion of the first mounting hole is held between the one end face of the large-diameter tubular portion and a radially protruding portion of the first connecting portion, and such that a contact portion of the second connecting portion is in close contact with an inner peripheral wall of the second mounting hole, the inner peripheral wall defining an inner peripheral portion and an outer peripheral portion, the inner peripheral portion being between the outer peripheral portion and the other end face, the other end face spaced from the inner peripheral portion and defining a continuous gap between the inner peripheral portion and the other end face.

6. The method according to claim 5, wherein an axial length of the large-diameter tubular portion of the tubular member is set to be shorter than an allowable lower limit of a distance between the pair of plate-like halves, for interposing the large-diameter tubular portion between the pair of plate-like halves, and a projecting length of the second connecting portion of the tubular member from the other end face of the large-diameter tubular portion is set such that the second connecting portion passed through the second mounting hole is bulged and deformed radially outward with the contact portion of the second connecting portion being in close contact with the inner peripheral wall of the second mounting hole.

* * * * *